April 21, 1953     G. B. HILL     2,635,410
SIDE-DELIVERY RAKE
Filed March 1, 1948     4 Sheets-Sheet 3
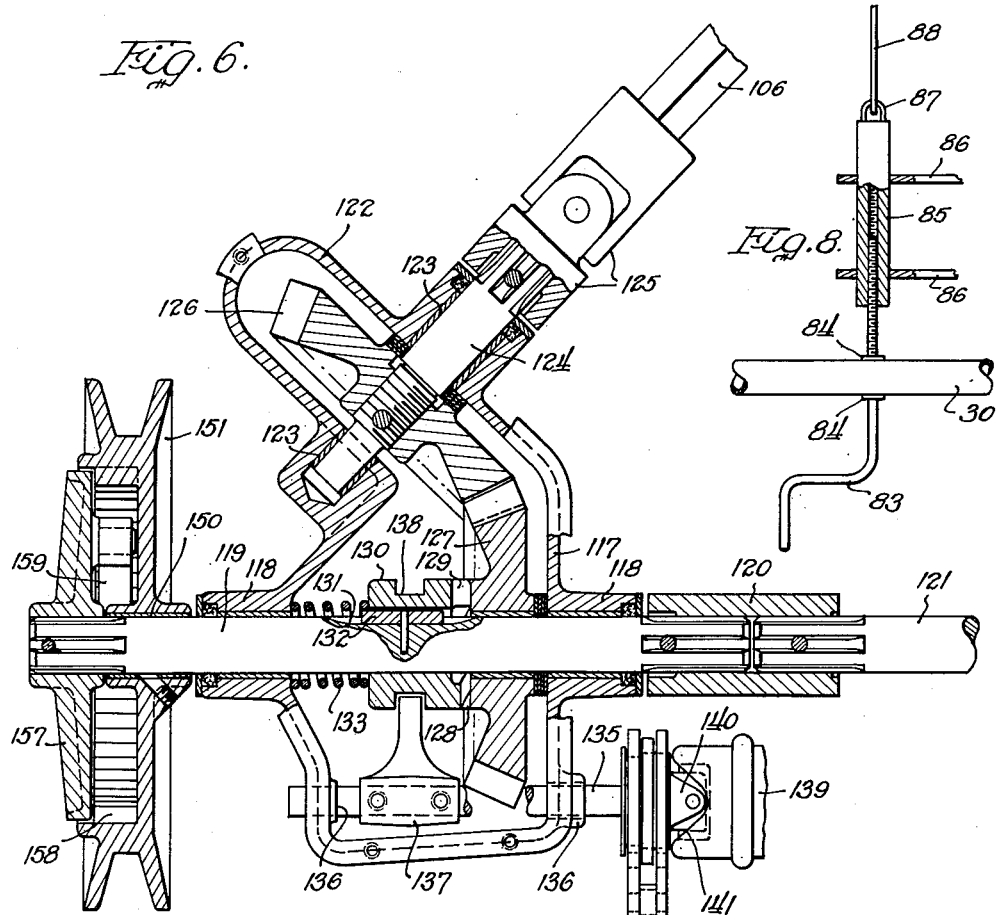
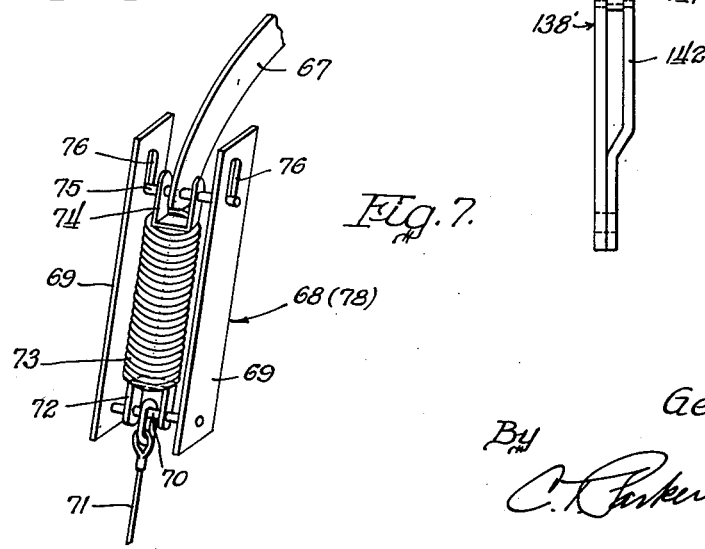
Inventor:
George B. Hill.

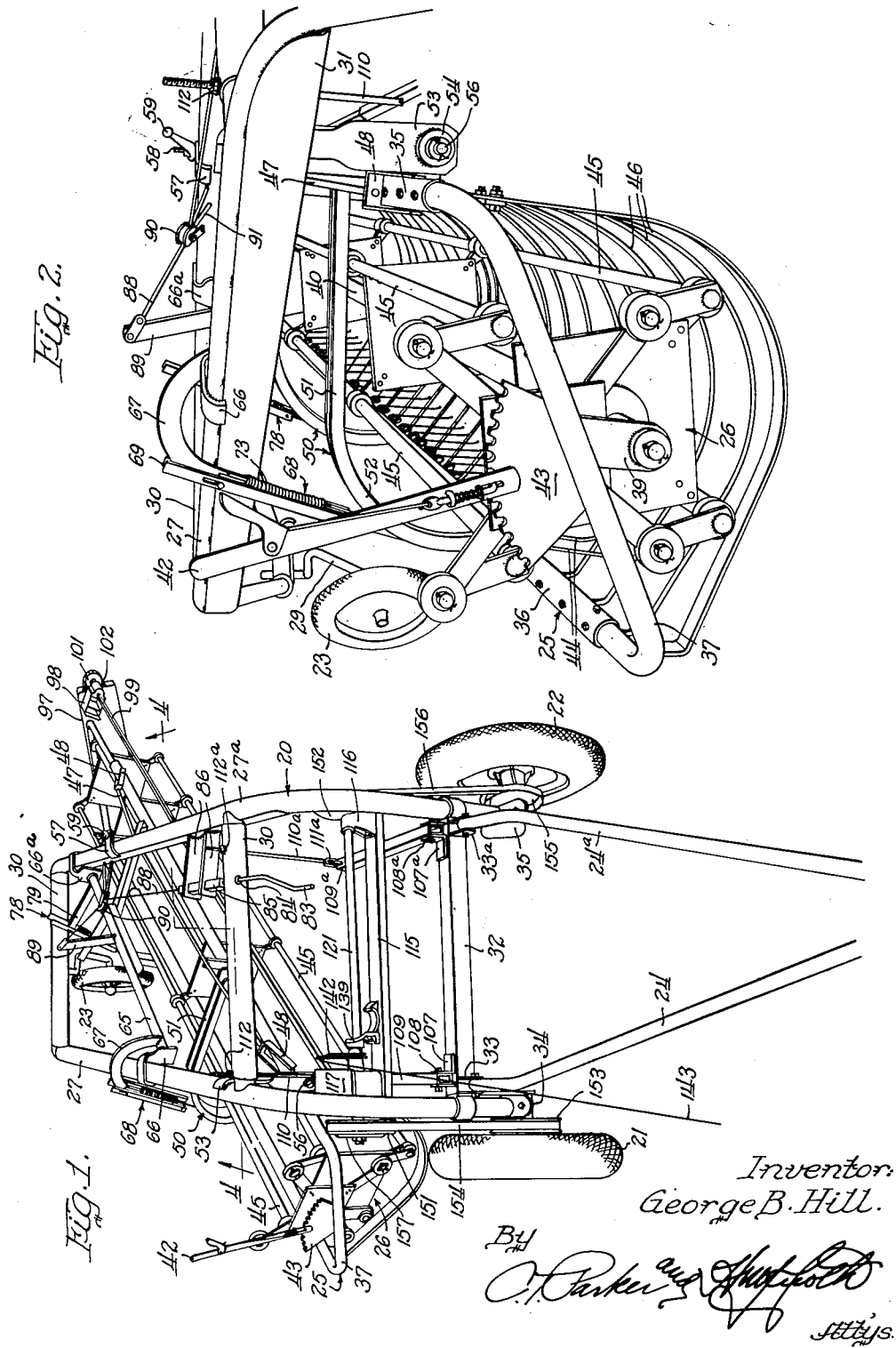

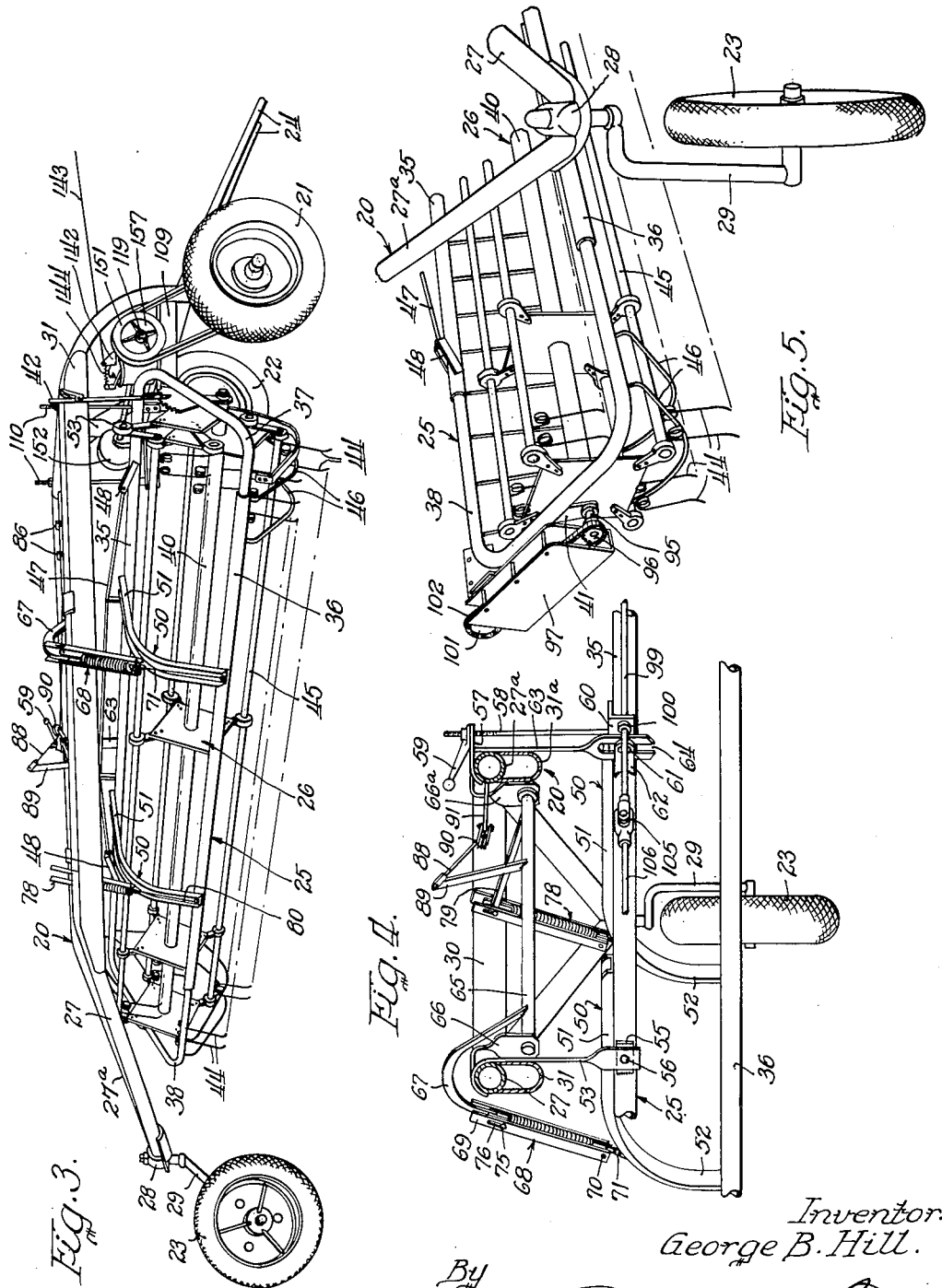

April 21, 1953  G. B. HILL  2,635,410
SIDE-DELIVERY RAKE
Filed March 1, 1948  4 Sheets-Sheet 4
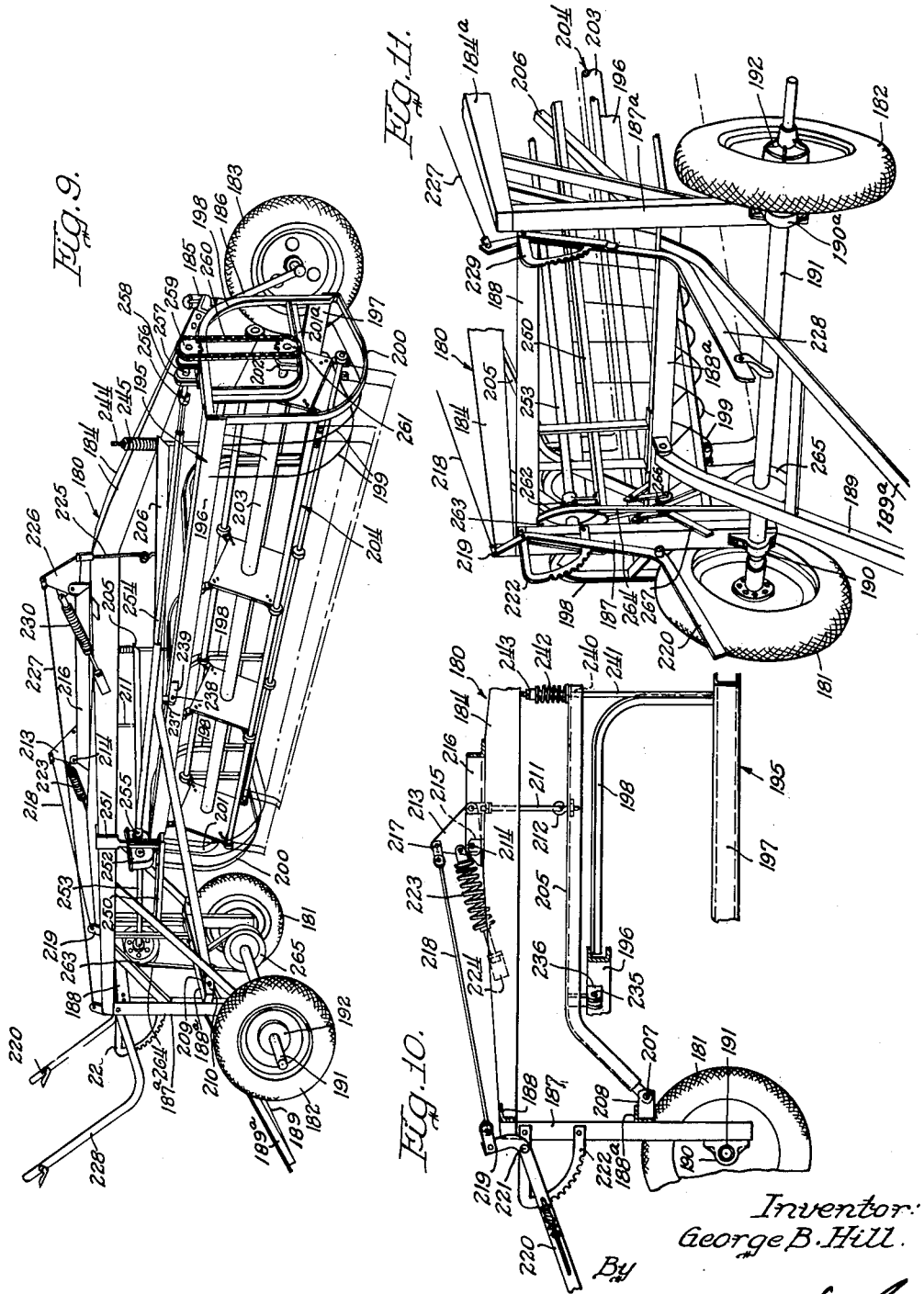
Inventor:
George B. Hill.

Patented Apr. 21, 1953

2,635,410

UNITED STATES PATENT OFFICE 2,635,410

SIDE-DELIVERY RAKE

George B. Hill, Ottumwa, Iowa, assignor to Deere Manufacturing Co., Dubuque, Iowa, a corporation of Iowa Application March 1, 1948, Serial No. 12,417

18 Claims. (Cl. 56—377)

This invention relates to a side-delivery rake and more particularly to an improved rake of the type adapted for high speed operation behind a tractor or other towing vehicle.

The invention contemplates and has for its principal object the provision of an improved rake construction including a main frame carried by ground wheels in such manner that the height of the main frame is fixed above the ground and further including a sub-frame carried by the main frame for vertical floating movement and further for vertical adjustment, the sub-frame being provided in such manner as to carry a rotatable rake reel. An object of the invention pertains to the simplification of rake reel construction in general and to establish a departure from the conventional type of side-delivery rake in which the rear end of the rake is adjustably carried by a caster wheel or similar rolling ground-engaging means. In such prior constructions, it was necessary, in order to adjust the reel with respect to the ground, to raise or lower the entire main frame about a pivot axis established by the front wheel axis, which in every case required that the operator lift substantially the entire weight of that portion of the main frame normally carried on the caster wheel. According to the present invention an improved suspension for the rake reel is provided and includes means whereby the main frame is fixed at a constant level and a light weight sub-frame is adjusted for the purpose of accomplishing adjustment of the rake reel.

A further feature of the present invention relates to improved means for driving the rotatable reel, the improved driving means being designed with reference to the higher speeds of operation attainable in rakes drawn by tractors or other towing vehicles. In this respect it is an object of the invention to accommodate the driving means to changes in position effected by adjustment of the sub-frame carrying the rake reel. A further related object pertains to the driving of the rake reel by means deriving power from the front wheel means or rolling ground-engaging means.

Other objects of the invention pertain to the resilient supporting of the reel frame from the main frame; the provision of improved over-running or one-way clutch means so that both of a pair of wheels may be ultilized to drive the rake reel; and an improved type of operating means for controlling the driving means so that the driving means may be connected or disconnected at the will of the operator.

The foregoing and other important objects and desirable features of the invention will become apparent to those skilled in the art as the disclosure is more fully made of the preferred embodiments of the invention as described in detail in the following specification and as shown in the accompanying sheets of drawings wherein Figure 1 is a perspective view illustrating generally the appearance of the machine, as viewed from the front and the top;

Figure 2 is an enlarged fragmentary perspective view showing the machine as it appears when viewed from its right side;

Figure 3 is a perspective view of the entire machine as it appears when viewed from a position to the right and slightly to the rear thereof;

Figure 4 is an enlarged fragmentary transverse sectional view taken substantially through a plane that includes the line 4—4 of Figure 1;

Figure 5 is an enlarged fragmentary perspective view showing the rear portion of the rake;

Figure 6 is an enlarged view with parts broken away and others in section of a portion of the driving means for the rotatable rake reel;

Figure 7 is an enlarged fragmentary perspective view of one of the combined lost-motion and resilient connections for suspending the sub-frame;

Figure 8 is an enlarged view with parts broken away of a portion of the control means for raising and lowering the sub-frame;

Figure 9 is a perspective view of a modified form of rake as it appears when viewed from the left side thereof;

Figure 10 is a fragmentary side view, partly in section, illustrating in detail the manner of supporting the reel frame; and Figure 11 is a fragmentary perspective view illustrating those features of the machine that appear when the machine is viewed from a position substantially directly from the front thereof.

The form of the invention shown in Figures 1-8 is similar in many respects to the form of the invention shown in Figures 9-11. However, the description of each form will be kept separate for the purposes of clarity, it being understood that the illustration of the two forms, or the illustration of the specific details in either form, does not establish the limits of the invention or the alternate forms that the invention may assume in practice. The disclosure should, therefore, be taken as illustrative and not restrictive.

The rake of Figures 1-8 includes, generally, a longitudinal main frame 20 carried at its front end on rolling ground-engaging means in the form of a pair of transversely spaced front wheels 21 and 22. The rear end of the main frame 20 is carried on a rolling ground-engaging means in the form of a single castering wheel 23. The forward end of the main frame 20 includes hitch means in the form of a pair of forwardly converging bars 24 and 24a by means of which the machine may be towed behind a tractor or similar vehicle. The general extent of the frame 20 is along the line of travel.

The rake includes a sub-frame or reel-carrying frame 25 which is disposed below the main frame between the front and rear wheels and which is further arranged at an angle or diagonal to the line of travel of the machine. The sub-frame 25 is pivoted to the main frame 20 on a diagonal axis so that the sub-frame may rise and fall with respect to the main frame. The pivotal mounting of the sub-frame on the main frame will be described in detail subsequently.

The sub-frame is further resiliently suspended from the main frame so as to have a floating action with respect thereto as the machine travels over the ground. The details of this construction will be set forth subsequently. The sub-frame carries a rotatable reel, indicated generally by the numeral 26, carried on a shaft that extends diagonally with respect to the line of travel and rotated by means deriving power from the front wheels 21 and 22, in a manner to be presently described.

The main frame is made up of a pair of generally longitudinally extending tubular frame bars 27 and 27a which extend in parallel relationship for a considerable portion of their length and then converge rearwardly to a point at which they are interconnected by a casting 28 (Figure 3) which provides a bearing on a vertical axis for an axle 29 for the caster wheel 23. The parallel portions of the frame members 27 are rigidly cross connected by a plurality of bracing members 30, preferably of tubular construction and preferably welded to the bars or members 27, 27a. Each of the frame members 27, 27a is further reenforced or strengthened by the addition thereto of a U-shaped channel member 31, 31a (Figure 4), the connection between the members 27, 27a and the members 31, 31a preferably being accomplished by welding.

The forward portions of the frame bars 27, 27a are directed downwardly to provide a generally upright supporting structure rigidly cross braced at its lower portion by a transverse bar or member 32, which is likewise preferably of tubular construction. This bar or member 32 carries spaced apart brackets 33, 33a to which are pivotally connected the rear ends of the hitch members 24 and 24a. The lower end of the downwardly extending portion of the right hand frame bar 27 has rigidly secured thereto a casting or other suitable member 34 which includes a bearing for the right hand front wheel 21. A similar construction is provided at 35 for the left hand front wheel 22. The supporting of the main frame 20 on the wheels 21, 22 and 23 is such that the parallel portions of the frame members 27, 27a are substantially horizontal and at a comparatively high level above the ground. This level of the main frame is fixed with respect to the wheels 21, 22 and 23, there being no provision for adjustment of the main frame vertically as in the case of rakes of prior construction. The construction just described provides an upward arch in the main frame so that the reel-carrying or sub-frame 25 may be conveniently carried below the main frame and between the front and rear wheels. The construction also adequately accommodates the means for suspending and adjusting the reel-carrying frame, the constructional details of which will be described below.

The sub-frame 25 includes an upper portion of elongated rectangular construction, the parts of which are preferably tubular in cross section. These parts include a leading or forward member 35, a parallel trailing member 36 and opposite end members 37 and 38, the latter being U-shape and having their leg portions respectively carried by opposite tubular ends of the leading and trailing members 35 and 36, whereby the length of the sub-frame may be varied. The parts 35 and 36 have been designated respectively the leading and trailing members with reference to their position during the normal travel of the rake. Similarly, the end members 37 and 38 may be called right hand and left hand members, respectively. The end member 37 includes a depending bracket 39 (Figure 2) in which is journaled one end of a relatively long shaft 40 on which the reel 26 is carried. The opposite end of this shaft is journaled in a bracket 41 carried by the opposite or left hand end member 38. The reel may be of any conventional construction and that shown is similar in many respects to the reel disclosed in the U. S. patent to Grieves 1,435,293 and reference may be had to that patent for the details of construction and operation of the general type of reel referred to. The right hand end 37 of the sub-frame 25 carries a lever 42 and quadrant 43 which provides means (not shown) for adjusting the reel 26 with respect to the angularity of a plurality of rake teeth 44 carried by a plurality of rake bars 45 that run parallel to the reel shaft 40, as is more or less conventional. In the drawings it will be noted that the general illustration of the rake teeth 44 is somewhat diagrammatic for the purposes of clarifying the illustration. The sub-frame 25 further includes a plurality of arcuate stripper bars 46 which curve downwardly from the leading member 35 and back upwardly to the trailing member 36, being associated with the rake teeth 44 in a well known manner. The leading member 35 of the sub-frame 25 is stiffened by a relatively long truss member 47 extending above and generally parallel to the member and secured at opposite ends to the member by U-shaped brackets 48. The sub-frame 25 is suspended from or supported by the main frame 20 by means including a pair of supports or bars 50. Each of these bars includes an upper horizontal portion 51 and a rear downwardly curving portion 52. The forward portion of each bar 50 is rigidly secured to the leading member 35 of the sub-frame 25 and the lower rear portion of each bar is rigidly secured to the trailing member 36 of the sub-frame.

The right hand frame member 27 of the main frame 20 has rigidly secured thereto, as by welding, near the forward cross brace member 30, a depending bracket 53 which includes at its lower end a bearing 54 on an axis parallel to the leading member 35 of the sub-frame. This bearing is adjacent an apertured member in the form of an ear 55 which is rigidly secured to and projects forwardly from the leading member 35 of the sub-frame. A pivot pin 56 connects the lower portion of the bracket 53 and the ear 55, being accommodated by the bearing 54 so that the sub-frame is pivotally carried by the main frame for vertical movement of the former with respect to the latter. A further portion of the sub-frame is also pivotally carried by the main frame and the supporting means for accomplishing this result includes a pivot and means for adjusting the same so that the pivot axis between the sub-frame and the main frame may be raised and lowered, at least in part. The second supporting means includes a bracket 57 rigidly secured to the left hand frame member 27a of the main frame 20 in substantially diagonal alignment with the bracket 53. The bracket 57 is apertured to receive the upper threaded end of a depending rod 58 and the threaded end receives an adjusting member or handle 59, which is internally threaded to receive the threaded end of the rod. The lower end of the rod 58 is connected in supporting relation to a bracket in the form of an angle member 60 rigidly secured to the leading member 35 of the sub-frame and projecting forwardly therefrom. This bracket 60 carries a pivot pin 61 on an axis in alignment with the axis of the pivot pin 56, the common axis of the pins being parallel to the leading member 35. The pin 61 is further received in an apertured ear or bracket 62 which is rigidly secured to and projects forwardly from the leading member 35 of the sub-frame. This type of support for this portion of the sub-frame provides for vertical adjustment of the pivot provided by the pivot pin 61, the connections including the bearing 54 and pivot pin 56 being sufficiently loose to permit this type of movement. In order that the movement of the sub-frame 25 may be limited to vertical movement, guide means is provided between the main frame 20 and sub-frame 25. This guide means takes the form of a depending member 63 rigidly secured at its upper end to the left hand frame member 27a of the main frame and slotted at 64 at its lower end to embrace the pivot pin 61 between the bracket members 60 and 62. The guide means thus controls movement of the forward portion of the sub-frame 25 and in conjunction with the depending bracket 53 prevents displacement of the sub-frame in any direction except vertical.

As further means for supporting or suspending the sub-frame from the main frame, there is provided a rockshaft 65 which is journalled at its opposite ends in brackets 66, 66a respectively carried by the spaced apart frame members 27, 27a of the main frame. The disposition of the brackets 66, 66a is such that the axis of the rockshaft 65 is above and generally parallel to the extent of the sub-frame 25. The right hand portion of the rockshaft 65 has rigidly secured thereto an upwardly arched control arm or tie member 67. The general level of the rockshaft 65 is below the uppermost level of the frame members 27; hence the arched arm 67 extends upwardly and over the right hand frame member 27 and includes flexible means which is connected to the sub-frame 25 by means of the proximate support or bar 50 and a combined lost motion and resilient connection, indicated generally at 68. The construction of this connection appears in Figure 7 wherein it is shown that there is provided a pair of parallel upwardly extending side bars 69 cross connected at their lower ends by a transverse pin 70 to which is connected the upper end of a flexible element which is here shown as a cable 71; although, the cable may be a chain or its equivalent. The other end of the cable 71 is appropriately connected to a lower portion of the downwardly curved part 52 of the supporting bar 50, preferably by means of the connection that secures the bar to the trailing member 36 of the sub-frame. The transverse pin 70 carries thereon a U-shaped member 72 which is rigidly connected to the lower end of a coiled tension spring 73. The upper end of the spring 73 is rigidly connected to a second U-shaped member 74 which is in turn connected to a transverse pin 75. The pin 75 also passes through an aperture in the rock-shaft arm 67 and through slots 76 provided respectively in the side bars 69 of the connecting means 68. The weight of the sub-frame 25 is thus carried through the spring 73, there being a similar construction used with respect to a resilient connection 78 which is utilized for effecting a connection between the other of the supporting bars 50 and a second arm or time member 79 on the rear or left hand end of the rockshaft 65. The connection 78 includes a flexible element in the form of a cable 80 having its lower end connected to the lower portion of the other supporting bar 50.

The rockshaft 65 is unrestrained in so far as concerns its movement as effected by movement of the arms 67 and 79 upwardly. At the same time the resilient support of the sub-frame 25 by means of the lost motion and resilient connections 68 and 78 allows the sub-frame to float relatively freely within rather wide limits. Consequently, should the stripper bars on the sub-frame encounter a rise in the ground, the sub-frame may move upwardly about the pivot axis through the pivot pins 56 and 61. This movement will not be opposed, inasmuch as the connections between the resilient means 68 and 78 are by means of the flexible elements 71 and 80. After the rise in the ground has been passed by the rake, the frame may drop gently to its normal position, being cushioned in this respect by the spring means 73, the lost motion provided by means of the pin 75 and slots 76 accommodating elongation of the spring 73 and consequent downward movement of the side bars 69 with respect to the rockshaft arm 67, it being understood that a comparable result occurs with respect to the other portion of the sub-frame and the other rockshaft arm 79.

It is another feature of the invention to provide means for controlling or adjusting the vertical position of the sub-frame with respect to the main frame. This adjusting means includes the rockshaft 65 and rockshaft arms 67 and 79. Inasmuch as the rake is propelled in a forward direction by means of a tractor or other towing vehicle, it is desirable that control means for operating the rockshaft 65 be located at the forward end of the machine to be within convenient reach of an operator on the seat of the tractor. The control means therefore includes a rotatable member in the form of a crank 83 rotatably carried or journaled in the forward cross brace 30 (see Figure 8). The crank is held against displacement along its longitudinal axis with respect to the member 30 by means of a pair of collars 84. The straight portion of the crank 83 rearwardly of the member 30 is threaded into an internally threaded portion of a member 85 carried for longitudinal movement in a pair of spaced apart brackets or supports 86 rigidly secured to the left hand frame member 27a of the main frame. The member 85 is preferably square in cross section so that it cannot rotate in the brackets 86 but may have movement longitudinally with respect thereto when propelled by the crank 83 when the latter is rotated. The member 85 includes an eye 87 to which is connected one end of a flexible element, such as a cable 88. This cable extends rearwardly and is connected to the upper end of an intermediate element in the form of a control arm 89 which has its lower end rigidly secured to the rockshaft 65 intermediate the rockshaft arms 67 and 79. An intermediate portion of the cable 88 is trained about a guide pulley 90 appropriately carried on a bracket 91 secured to the inner side of the left hand frame member 27a of the main frame (Figure 4). As the crank 83 is rotated in one direction, it will propel the member 85 forwardly, drawing the cable 88 and thus rocking the rockshaft in a forward and upward direction to effect raising of the sub-frame about its pivot axis through the pivot pins 56 and 61. When the crank is rotated in the opposite direction, the sub-frame will return to a lower position by force of gravity by means of its own weight.

In the rake disclosed here, the reel 26 is rotated by driving mechanism which carries power from the front wheels 21 and 22 to the rear end of the reel shaft 40. As best shown in Figure 5, the reel shaft 40 extends rearwardly beyond the rear bracket 41 as an extension or continuation 95 of reduced diameter. This extension has keyed thereto a driving sprocket 96. As best shown in Figures 1 and 5, the rear end of the sub-frame carries shielding and supporting structure, indicated generally by the numeral 97, at the forward end of which is rigidly carried a supporting bracket 98 which provides a journal or bearing for a shaft section 99 that runs longitudinally with respect to the sub-frame 25. The shaft section 99 substantially parallels the leading member 35 of the sub-frame and in length is substantially half the length of the sub-frame, being carried at its forward end by means of a bearing 100 in the bracket 60 previously described (Figure 4). The shaft section 99 is thus rotatably carried by means on the sub-frame independently of the main frame and extends at its rear end rearwardly beyond the bearing bracket 98 at which point it has keyed thereto a driving sprocket 101 (Figure 1). A driving chain 102, preferably of the roller type, is trained about the sprockets 96 and 101 and provides part of the power transmitting means for driving the rake reel 26. The structure 97 is appropriately formed to shield the chain 102 (Figure 5).

The forward portion of the shaft section 99 that extends forwardly of the bearing 100 in the bracket 60 is connected by means of a universal joint 105 (Figure 4) to the rear end of a second shaft section 106. In the illustration in Figure 4 the shaft section 99 has been broken away in part to illustrate the pivotal connection 61. The shaft section 106 is substantially coaxial with the shaft section 99 and forms, in effect, a continuation thereof and serving as means for carrying the drive from the front end of the machine to the rear end. The forward end of the shaft section 106 is associated with driving mechanism at the front end of the main frame, which mechanism will be described below.

The transverse member 32 at the lower end of the downwardly extending structure at the forward end of the main frame 20 is provided with a pair of transversely spaced apart bracket means 107, 107a each of which carries a pivot pin 108, 108a by means of which supporting structure, including a pair of parallel rearwardly extending bars 109, 109a, is carried or mounted on the main frame. The forward ends of the bars 109, 109a are thus mounted on the main frame on a transverse hinge axis for movement vertically with respect to the main frame and the rearward ends of the bars are adjustably carried by the main frame, preferably through the medium of a pair of upstanding bars 110, 110a, each of which is pivotally connected at its lower end at 111, 111a to the respective bar or support 109, 109a and each of which is threaded at its upper end and passes through a vertical aperture in the forward cross member 30, each threaded end receiving adjustably thereon a nut 112, 112a by means of which the position of the bars 109 may be varied vertically with respect to the main frame 20 (Figures 1 and 2).

The bars 109, 109a are rigidly cross connected by a transverse supporting member 115. This member includes at one end thereof an upstanding bearing bracket 116 and at its other end a gear housing 117. As best shown in Figure 6, the gear housing 117 is provided with a pair of coaxial bearings 118 spaced apart on a transverse axis above and parallel to the rolling axis of the front wheels 21 and 22. These bearings serve to journal therein a short shaft 119 which is connected by a coupling 120 to a coaxial longer shaft 121, the two shaft sections 119 and 121 providing, in effect, a countershaft disposed above the front wheels 21 and 22 and carried on the supporting frame including the rearwardly extending bars 109, the left hand end of the shaft section 121 being journaled in the bearing 116 at the left hand end of the transverse support 115.

The housing 117 also includes an angularly related portion 122 which provides a pair of bearings 123 spaced apart on an axis coaxial with the axis of the drive shaft section 106 previously described. The bearings 123 journal a short shaft section 124 which is connected by means of a universal joint 125 to the forward end of the shaft section 106, thus completing the shafting from the gear housing 117 to the rear end of the reel or sub-frame 25. The short shaft 124 carries within the housing portion 122 and between the bearings 123 a bevel gear 126. This gear is fast to the shaft 124, the connection here being shown as a threaded and pin connection. The gear 126 is in constant mesh with a second bevel gear 127 journaled on the short shaft 119 just inwardly or to the right of the left hand bearing 118 (reference to right and left hand sides being made with respect to a position looking forwardly from the rear of the machine). The inner or right hand face of the bevel gear 127 is, at its hub portion, provided as a clutch face 128 which is engageable with and disengageable from a corresponding clutch face 129 on a shiftable clutch member 130. The intermediate portion of the shaft 119 is provided with a keyway 131 which has pinned thereto a key 132 on which the clutch member 130 is slidable axially of the shaft 119, at the same time the clutch member being fixed to the shaft 119 for rotation therewith. The particular type of connection illustrated is only representative of many forms that the connection could take, it being necessary only that some form of mounting being provided so that the clutch member 130 is shiftable toward or away from the gear 127 while being held by the shaft 119 for rotation therewith. A coiled compression spring 133 surrounds the shaft 119 and is interposed between the left hand face of the bearing 118 and the right hand face of the clutch member 130, the effect of the same being to urge the clutch member 130 always into engagement with the clutch face or portion 128 on the gear 127.

The clutch member 130 is controlled for engagement and disengagement by means of a shiftable rod 135 slidably carried by transversely spaced bearing portions 136 in the forward portion of the housing 117. That portion of the rod 135 within the housing 117 has rigidly secured thereto a shifter fork 137 which engages an annular groove 138 in the clutch member 130, as is more or less conventional. In Figure 6, the rod 135 within the housing 117 has a portion thereof broken away to better illustrate the bevel gear 127, it being understood that the portion of the view including the rod 135 and bearings 136 and fork 137 is in a plane different from that in which the main section is taken.

The rod 135 extends to the left outside the housing 117 and is associated thereat with control means including a movable member 138' and a stationary member 139. As best shown in Figure 1, the stationary member 139 is part of a bracket means carried by the transverse member 115 just to the left of the gear housing 117. The extreme left hand end of the rod 135 carries rotatably thereon a cam member 140 which cooperates with a cam face 141 on the stationary member 139. The movable member also includes a control lever 142 likewise rockable on the rod 135 so that rocking of the lever 142 effects rocking of the cam 140 for the purpose of displacing the rod 135, and consequently the shifter fork 137, to the right, or toward a position in which the clutch member 130 will be disengaged from the bevel gear 127. Further rotation of the cam member 140 by the lever 142 will restore the cam member 140 to the low portion of the cam member 141 on the stationary member 139, and the spring 133 operating against the clutch member 130 will return the clutch member and the shifter fork 137, together with the rod 135, to a position in which the clutch 130 is engaged with the bevel gear 127. It will thus be seen that continued rotation of the cam member 140 in the same direction will alternately displace the rod 135 to the right and to the left, reference to these directions being made with respect to a position looking forwardly from the rear of the machine. The connection between the lever 142 and the cam 140 may be any of the conventional one-way connections with which those skilled in the art are familiar and further illustration thereof is believed to be unnecessary. The lever 142 is connected to a pull rope 143 by means of which an operator on the towing vehicle may control the clutch 130. The arrangement is thus of the type in which successive pulls on the rope 143 will alternately engage and disengage the clutch 130. A spring, such as that indicated at 144 in Figure 3, may be connected between the lever 142 and the bracket on the gear housing 117 for returning the lever to starting position, a practice that is conventional and is well known to those skilled in the art. By the means just described, driving engagement between the countershafts 119—121 and the drive shaft including the sections 124, 106 and 99 may be made or broken at the will of the operator to connect or disconnect the rotatable reel 26 with respect to rotation thereof. The shafts 119—121 derive power from the wheels 21 and 22 in a manner to be set forth below.

The short shaft 119 projects at the right hand side of the gear housing 117 to carry loosely thereon by means of a bearing 150 a rotatable driven member in the form of a grooved belt pulley 151. The opposite end of the coaxial shaft 121 carries, in a similar manner (not shown), a similar member or pulley 152. The pulley 151 is directly above a grooved driving member or belt pulley 153 carried by the right hand front wheel 21 for rotation therewith. A driving belt 154 is trained about the pulley and constitutes driving means so that the pulley 151 is rotated in response to rotation of the right hand wheel 21. The left hand pulley 152 is similarly disposed with respect to a grooved belt pulley 155 on the left hand wheel 22, and a driving belt 156 is provided for connecting the pulleys 152 and 155 so that the former will be rotated by the latter. The connections between the pulleys 151 and 152 and the countershafts 119—121 are effected by means providing for variations in speed between the wheels 21 and 22 when the rake is being turned. Each of these means may be a clutch mechanism of any conventional construction and, as shown, each end of the shafts 119—121 has keyed thereto a driving member 157. This driving member for the right hand pulley 151 is illustrated clearly in Figure 6 and the member 157 for the left hand pulley 152, although not illustrated, is similar. The interior of the pulley 151 is provided with a plurality of peripheral spaced teeth 158 engageable by a pivoted dog 159 carried on the inner face of the member 157. The interior of the left hand pulley 152 is similarly arranged with respect to a dog (not shown) on the left hand member. The mechanism illustrated here, by way of example, accomplishes overrunning of the pulleys 151 and 152 by the shafts 119—121 in the event that the shafts 119—121 are speeded up during turning of the rake. The relationship between the pivoted dogs 159 and 158 is comparable to the well known ratchet clutch mechanism commonly used in constructions of this type.

In the operation of the rake embodying the principles of the invention disclosed here, the rake may be towed at relatively high speeds behind tractors or similar towing vehicles. The mounting of the sub-frame on the main frame is accomplished in such manner as to provide a wide range of flexibility, so that the sub-frame may easily accommodate itself to uneven terrain. At the same time, the construction is light in weight and raising and lowering of the sub-frame is easily accomplished, inasmuch as it is not necessary to move the entire main frame. The driving mechanism for the reel also accommodates itself to flexing of the sub-frame with respect to the main frame, as provided by the universal joints in the power transmitting connection. The control means for raising and lowering the sub-frame and the control means for actuating the clutch of the driving mechanism are conveniently disposed with respect to an operator on the towing vehicle. Other features of the invention will undoubtedly suggest themselves to those skilled in the art, as will modifications and alterations in the preferred construction illustrated.

The embodiment of the invention shown in Figures 9, 10 and 11 includes many of the features of the embodiment just described, and in addition includes other features, all of which will appear from the detailed description thereof to follow.

In this embodiment of the rake, there is provided a main frame 180 carried on transversely spaced front wheels 181 and 182 and on a single castering rear wheel 183. The main frame 20 includes in its structural components a pair of generally longtiudinally extending side frame members 184 and 184a which are parallel throughout a substantial portion of their extent and which converge toward the rear to provide for the mounting of a casting 185 in which is journaled on a vertical axis the upper end of an axle 186 for the caster wheel 183. The forward portion of the main frame includes a pair of upright supporting members 187, 187a spaced apart transversely on the order of the spacing of the side frame members 184 and rigidly cross braced by a pair of vertically spaced transverse members 188 and 188a, the lower of which (188a) includes means for effecting a pivotal connection with a pair of forwardly extending bars 189 and 189a which constitute part of a hitch means whereby the rake may be drawn by a tractor or other towing vehicle. The upright members 187, 187a are provided at their lower ends respectively with bearings 190 and 190a and these bearings are in transverse alignment to carry rotatably therein a transverse axle 191. The opposite ends of the axle are carried respectively by the wheels 181 and 182 and the connections between the wheels and axle may be effected by means of one-way clutches or ratchet mechanisms (not shown) which may be of any well known type. The numeral 192 indicates generally the hub structure on the left hand wheel 182 in which such mechanism may be contained, it being understood that the right hand wheel includes a similar hub. The type of clutch used is immaterial, and has not therefore been illustrated in detail, it being only necessary that some form of clutch or ratchet mechanism be utilized so that the rake may be easily turned.

The construction of the frame 180 and the carrying thereof on the wheels 181, 182 and 183 is such that the main frame is carried at a fixed point above the ground, in a manner similar to the disposition of the main frame 20 of the embodiment of the invention described above.

This rake, like the one previously described, includes a sub-frame, here indicated by the numeral 195, which extends downwardly with respect to the general or longitudinal extent of the main frame 180. The sub-frame or reel-carrying frame 195 is made up of a diagonal leading member 196 and a parallel trailing member 197, reference to the description of the parts in this respect being made in view of the positions assumed by these parts in the normal operation of the rake. The trailing member 197, in addition to being disposed rearwardly or to the right of the leading member 196 is also disposed at a level below the member 196. The two members are appropriately interconnected at intervals spaced longitudinally thereof by a plurality of rearwardly and downwardly extending frame bars 198. The sub-frame also includes a plurality of longitudinally spaced stripper bars 199, here illustrated only diagrammatically, and a pair of end stripper members 200, the end members being relatively stronger than the other stripper members 199 and serving, in addition to bracing the sub-frame, as means on which the sub-frame may ride in the event that a high piece of ground is encountered. The frame bars 198 at opposite ends of the sub-frame respectively include supporting members 201 and 201a and each member 201, 201a carries a bracket 202 forming a bearing (only one of which is shown) for journaling a reel shaft 203 on which is mounted a rake reel 204. This reel may be similar to that previously described and no further description thereof is believed necessary. The illustration of the rake teeth and stripper bars is diagrammatic in many respects to clarify the disclosure.

In this embodiment of the invention as in the case of that previously described, the sub-frame is carried by the main frame in a manner permitting vertical movement of the former with respect to the latter, and there is also provided pivotal means for carrying a portion of the sub-frame and resilient suspension means for carrying another portion of the sub-frame. To this end, the main frame 180 is provided with supporting structure including a pair of rearwardly extending supporting bars 205 and 206, the right hand bar being shorter than the left hand bar because of the diagonal relationship between the sub-frame 195 and main frame 180. As best shown in Figure 10, the forward end of the bar 205 is bent downwardly and forwardly and is pivotally connected at 207 to an ear or bracket 208 carried on the rear portion of the lower transverse bracing member 188a. As best shown in Figure 9, the left hand bar 206 is bent downwardly and forwardly intermediate its ends and extends toward the transverse member 188a just described, at which point it is pivotally connected at 209 to an ear or bracket 210 on the member 188a. The forward ends of the bars 205 and 206 are thus in transverse alignment on a common pivot axis through the pivots 207 and 209; although, the rear ends of the bars are diagonally positioned with respect to each other to accommodate the diagonal position of the sub-frame 195.

The bar 205 is supported from the main frame intermediate the end of the bar by means of a suspending connection including a vertical link 211 connected at its lower end to an eye 212 on the bar 205 and at its upper end to one arm of a bell crank comprising a triangular member 213. The bell crank member 213 is pivoted at 214 on a bracket 215 associated with a transverse brace member 216 which extends across the frame members 184. The other arm of the bell crank 213 is connected at 217 to a forwardly extending flexible element, such as a cable 218, which is in turn connected at its forward end to an arm 219 formed as part of a manually operated control lever 220. The control lever is pivoted at 221 on a quadrant 222 carried by the right hand upright member 187. Hence, by means of the lever 220, the rear end portion of the bar 205 may be moved vertically with respect to the main frame 180. Resilient means in the form of an assisting spring 223 is connected between the bell crank member 213 and a bracket 224 welded or otherwise rigidly secured to an inside face of the right hand frame member 184. The spring 223 is a tension spring and tends to urge the bell crank member 213 in a counterclockwise direction (as viewed in Figure 10) about its pivot 214; in other words, the spring 223 has a natural tendency to support the bar 205 resiliently through the link 212 and bell crank 213.

The suspension of the left hand bar 206 is similar to that just described in connection with the right hand bar 205, the bar 206 being connected by a vertical link 225 with a bell crank 226 which is associated with a forwardly extending flexible element in the form of a cable 227 connected in turn to a manually operable control lever 228 pivoted at the forward end of the main frame 180 on a quadrant 229. A spring 230 comparable in all respects to the spring 223 is associated with the bell crank 225 in a manner to resiliently support the right hand bar 206. The bars 205 and 206, being pivotally and resiliently supported by the main frame for vertical adjustment with respect thereto, serve to carry the sub-frame 195 in a manner to be set forth below.

A forward portion of the bar 205 has rigidly secured thereto a depending bracket (Figure 10) which forms a bearing or pivot 235 for carrying a portion of the leading member 196 of the sub-frame 195, the leading member including a bracket 236 connected to the pivot or bearing 235. An intermediate portion of the bar 206 carries a depending bearing bracket 237 (Figure 9) which is pivotally connected by a pivot or bearing 238 to a bracket 239 carried by a portion of the leading member 196 spaced from the bearing or pivot 235 in a direction longitudinally rearwardly as respects the general extent of the sub-frame 195. The sub-frame is thus suspended at its forward portion from the main frame 180, through the medium of the bars 205 and 206, for vertical movement about the common axis through the bearings or pivots 235 and 238. The bars 205 and 206 are so arranged that they extend below the general level of the upper portion of the main frame 180 and above the sub-frame 195. These bars extend sufficiently rearwardly to clear the sub-frame 195. The bar 205 is apertured at 240 on a vertical axis (Figure 10) to slidably receive a vertical rod 241. The lower end of the rod is connected to the trailing member 197 of the sub-frame and the upper end thereof passes through the aperture 240 and extends above the rear portion of the bar 205, at which point the rod is encircled by a coiled compression spring 242 held in place on the rod by a pin and washer assembly 243. The rear end of the rod 206 is similarly connected by means of a rod 244 and spring 245 (Figure 9) with a portion of the trailing member 197 spaced from the rod 241 in a generally rearward and longitudinal direction as respects the extent of the sub-frame. The construction is such that the sub-frame 195 may have vertical movement with respect to the bars 205 and 206 about the axis of the pivots 235 and 238, and this movement is controlled by the combined lost motion and resilient means including the rods 241 and 244 and the springs 242 and 245. It will be understood that the rear end of the bar 206 is apertured to receive the rod 244 very much in the manner of the aperturing of the bar 205 at 240, this type of connection permitting lost motion controlled by the springs 242 and 245 as the sub-frame 195 moves vertically with respect to the bars.

From the description thus far it will be seen that the sub-frame is resiliently supported in an ideal manner so that the raking mechanism may accommodate itself to uneven terrain. Extreme vertical movement of the sub-frame 195 is accommodated by the axis through the pivots 235 and 238 and further by the pivot axis through the pivots 207 and 209 respectively between the bars 205 and 206 and the forward end of the main frame 180. Since the cables 218 and 227 are flexible there will be no restraint on upward movement in so far as concerns the control levers 220 and 228. The control levers will, however, determine the lowermost extent or level to which the bars 205 and 206 may move. These levers also serve as means for adjusting and fixing the height of the sub-frame 195 with respect to the ground; although, limited vertical movement is permitted between the frame 195 and the supporting bars 205 and 206. For example, should the sub-frame encounter uneven terrain so that it is caused to move upwardly with respect to the bars 205 and 206 and then dropped downwardly after the unevenness has been passed, the drop will be cushioned by the springs 242 and 245. Further, should the obstacle or unevenness cause extreme upward movement of the sub-frame 195, such as to displace the bars 205 and 206 upwardly, dropping of these parts will be cushioned in addition by the springs 223 and 230.

Power for rotating the rake reel 204 is derived from the front wheels 181 and 182 and is preferably carried by appropriate shafting to the rear of the reel. For this purpose, a rearwardly extending support 250 (Figure 9) is carried at its forward end on the right hand upright 187 and at its rear end on a depending bracket 251 secured to the left hand frame member 184a. The supporting member 250 carries thereon a gear housing 252 which contains suitable gearing (not shown) connected to a forwardly extending shaft 253 and a rearwardly extending shaft 254. The forward end of the shaft 254 preferably includes a universal joint 255 so that the shaft may accommodate changes in position between the sub-frame 195 and main frame 180. The rear portion of the shaft 254 is preferably composed of telescopic sections and includes a universal joint connection 256 with a short shaft 257 journaled in a bearing 258 carried by the rear frame bar 198 between the leading member 196 and the trailing member 197 of the sub-frame 195.

The shaft 257 has keyed thereto a driving sprocket 259 about which is trained a driving chain 260. The chain is further trained about a sprocket 261 keyed to the rear end of the reel shaft 263.

The forwardly extending shaft 253 is journaled at its forward end in a bearing 262 (Figure 11) formed as part of a bracket carried by the supporting member 250. The forward end of the shaft has keyed thereto a belt pulley 263 about which is trained a driving belt 264. The belt is further trained about a driving pulley 265 keyed to the transverse axle 191 so that power taken by the axle from the wheels 181 and 182 may be transferred to the shaft 253 and thence to the gear box 252 to the shaft 254 and thence to the reel 204. Since the axis of the shaft 253 is angularly related to the axis of the axle 191 the belt 264 is necessarily twisted. An idler pulley 266 is carried by adjusting means 267 and engages the rear run of the belt 264. This idler forms no part of the invention and is therefore illustrated only generally.

It is thought that the operation of the rake constructed according to this embodiment of the invention will be clear from the description that has gone before. It will be noted that there is embodied in this form of the invention all the desirable features required in a rake adapted to be drawn at high speeds by tractors or other vehicles. The sub-frame is flexibly supported and is capable of adjustment with respect to the main frame. The parts to be moved in effecting such adjustment are relatively light and are properly balanced and assisted, as by the springs 223 and 230.

With respect to both forms of the invention illustrated herein, it should be remembered that the illustrations are based upon types of rakes presently found to be possessed of the requisite designs for accomplishing results in a highly efficient manner and that the precise details of construction illustrated should not be taken as limiting the applicability of the invention, since

What I claim is:

1. A side delivery rake, comprising: a generally longitudinal main frame having front and rear ends; means on the front and rear ends of the frame for fixing the frame at a constant height above the ground; a reel-carrying frame arranged with respect to the main frame to extend generally transversely thereof; pivot means on an axis generally paralleling the reel-carrying frame and connected between the main frame and reel-carrying frame for supporting the latter for vertical movement with respect to the former; a rockshaft carried by the main frame, and generally paralleling the pivot means axis; means for rocking the rockshaft; means operatively connecting the rockshaft and the reel-carrying frame so that the latter may be moved vertically as the former is rocked; said means including a lost-motion connection and spring element effecting a cushioned suspension for the reel-carrying frame but providing for movement thereof upwardly; and a rake reel rotatably carried by the reel-carrying frame independently of the main frame.

2. The invention defined in claim 1, further characterized in that: the main frame includes a pair of transversely spaced apart frame bars; the rockshaft is supported between said bars; and the operating connection between the rockshaft and reel-carrying frame includes an upwardly arched arm connected to the rockshaft and arched over one of said frame bars for connection to the reel-carrying frame.

3. The invention defined in claim 2, further characterized in that: the means for rocking the rockshaft includes a second arm on the rockshaft; and control means is carried by the other of the frame bars and connected to said second arm.

4. A side-delivery rake, comprising: a wheel supported main frame having front and rear ends and extending generally longitudinally as respects its direction of travel; a sub-frame arranged diagonally to the direction of travel and having leading and trailing members; means including first and second spaced apart pivots carrying spaced apart portions of the leading member on the main frame for vertical swinging of the sub-frame with respect to the main frame; means for adjusting at least one of said pivots vertically independently of the other of said pivots to raise or lower at least a portion of said leading member of the sub-frame; means including a lost-motion connection carrying the trailing member on the main frame; and a rake reel carried by the sub-frame.

5. A side-delivery rake, comprising: a wheel supported main frame having front and rear ends and extending generally longitudinally as respects its direction of travel; a sub-frame arranged diagonally to the direction of travel and having leading and trailing members; means including a frame bar, having front and rear end portions, pivoted at its front end on the main frame for vertical movement with respect to the main frame and extending generally rearwardly over the sub-frame; means pivotally carrying the leading member of the sub-frame on the front end portion of the frame bar for relative vertical movement of the two; means resiliently suspending the trailing member of the sub-frame from the rear end portion of said frame bar; means connected between the main frame and the rear end portion of said bar for raising or lowering the bar about its pivot, and consequently raising and lowering the sub-frame, with respect to the main frame; and a rake reel carried by the sub-frame.

6. A side-delivery rake, comprising: a wheel supported main frame having front and rear ends and extending generally longitudinally as respects its direction of travel; a sub-frame arranged diagonally to the direction of travel and having leading and trailing members; means including a frame bar, having front and rear end portions, pivoted at its front end on the main frame for vertical movement with respect to the main frame and extending generally rearwardly over the sub-frame; means carrying a portion of the leading member of the sub-frame on a forward portion of said frame bar for vertical movement of the sub-frame relative to the frame bar; means resiliently carrying a portion of the trailing member of the sub-frame on the frame bar to accommodate said vertical movement of the sub-frame; means connected between the main frame and said bar for raising or lowering the bar about its pivot, and consequently raising and lowering the sub-frame, with respect to the main frame, said last named means including a resilient suspension device accommodating said vertical movement of the frame bar relative to the main frame; and a rake reel carried by the sub-frame.

7. A side delivery rake, comprising: a generally longitudinal, substantially horizontal main frame having front and rear ends, and including at its front end downwardly extending frame structure; means at a lower portion of said structure for supporting the main frame front end at a fixed height above the ground; means at the rear end of the main frame for supporting same at a fixed height above the ground; a sub-frame positioned between the front and rear supporting means and extending generally transversely with respect to the main frame, and including a leading member and a trailing member; a rearwardly extending support pivoted at its forward end on the downwardly extending structure for up and down movement with respect to the main frame and projecting rearwardly over the sub-frame; means movably carried on the main frame and connected to a portion of the support rearwardly of its pivot to the aforesaid structure, for moving said support upwardly or downwardly; means pivotally conecting the leading member of the sub-frame to the support for vertical movement of the former with respect to the latter, yielding suspension means connecting the trailing member of the sub-frame to the support; and a rake reel carried by the sub-frame.

8. The invention defined in claim 7, further characterized in that: the means for moving the support upwardly and downwardly includes a control lever on a forward portion of the main frame; a spring-assisted bell crank on the main frame rearwardly of the control lever; and operating means connecting the lever and bellcrank.

9. A side delivery rake, comprising: a generally longitudinal, substantially horizontal main frame having front and rear ends; means for supporting the main frame front end; means at the rear end of the main frame for supporting same; a sub-frame positioned between the front and rear supporting means and extending generally transversely with respect to the main frame, and including a leading member and a trailing member; a rearwardly extending support pivoted at its forward end on the main frame for up and down movement with respect to the main frame and projecting rearwardly over the sub-frame; means movably carried on the main frame and connected to a portion of the support rearwardly of its pivot to the main frame, for moving said support upwardly or downwardly; means pivotally connecting the leading member of the sub-frame to the support for vertical movement of the former with respect to the latter; yielding means connecting the trailing member of the sub-frame to the support; and a rake reel carried by the sub-frame.

10. A side-delivery rake, comprising: a wheel supported main frame having front and rear ends and extending generally longitudinally as respects its direction of travel; a sub-frame arranged diagonally to the direction of travel and having leading and trailing members; supporting structure depending from the main frame ahead of the sub-frame; means connecting the leading member of the sub-frame to the supporting structure and including a pivot providing for vertical movement of the sub-frame with respect to the main frame; means including a resilient connection supporting the trailing member of the sub-frame on the main frame; means including said resilient connection and carried by the main frame and operatively connected to the sub-frame for raising or lowering the sub-frame about the aforesaid pivot; and a rake reel carried by the sub-frame.

11. A side-delivery rake, comprising: a wheel supported main frame having front and rear ends and extending generally longitudinally as respects its direction of travel; a sub-frame arranged diagonally to the direction of travel and having leading and trailing members; supporting structure depending from the main frame ahead of the sub-frame; a support, having front and rear end portions, pivoted at its forward end portion to said supporting structure for vertical movement thereof with respect to the main frame and extending rearwardly over the sub-frame; resilient suspension means carrying a rear portion of the support on the main frame; means connecting the leading and trailing members of the sub-frame to the support at fore and aft spaced apart portions of the latter for carrying the sub-frame; and a rotatable rake reel carried by the sub-frame.

12. The invention defined in claim 11, further characterized in that: a drive shaft having front and rear end portions is disposed generally in parallelism with the sub-frame; means is provided for journaling the rear end portion of the shaft on the sub-frame; means including a flexible joint is provided for journaling the forward end portion on the main frame; means is provided at the forward end of the main frame and operatively connected to the forward end of the shaft for driving the shaft; and means is provided at the rear of the sub-frame and operatively connecting the rear end of the shaft and the reel for driving the latter.

13. A side-delivery rake, comprising: a wheel supported main frame having front and rear ends and extending generally longitudinally as respects its direction of travel; a sub-frame arranged diagonally to the direction of travel and having leading and trailing members; means including first and second spaced apart pivots carrying spaced apart portions of one of the sub-frame members on the main frame for vertical swinging of the sub-frame with respect to the main frame; means for adjusting at least one of said pivots vertically independently of the other of said pivots to raise or lower at least a portion of said sub-frame member; and means sustaining the other sub-frame member on the main frame at a location spaced from said pivot means.

14. A side-delivery rake, comprising: a wheel-supported frame having first and second end portions spaced apart generally longitudinally as respects its direction of travel; a sub-frame disposed generally transversely of the main frame substantially intermediate the end portions thereof, and itself having first and second end portions spaced apart generally longitudinally as respects the direction of travel of the rake and respectively spaced vertically from the first and second end portions of the main frame; a plurality of sustaining means interconnecting transversely spaced apart points on the first end portion of the main frame and the first end portion of the sub-frame and providing connection about which the sub-frame may swing vertically relative to the main frame, at least one of said means including provision for vertical adjustment independently of the other of said pivots to vary the vertical distance between the first end portions of the main and sub-frames; and supporting means interconnecting the second end portions of the main and sub-frames, and including provision for the aforesaid vertical swinging of the sub-frame.

15. A side-delivery rake, comprising: a main frame; rolling ground-engaging means carrying the main frame; means including a rotatable rake mechanism carried by the main frame for vertical movement relative to the main frame and ground about a pivot axis at a level above the axis of the rolling ground-engaging means; a support hinged to the main frame independently of the rake mechanism on an axis at a level above the axis of the rolling ground-engaging means; a driven shaft journaled on the support and flexibly and drivingly connected to the rake mechanism; a pulley on the driven shaft; a driving pulley on the axis of and driven by the rolling ground-engaging means; a flexible endless drive element trained about the pulleys; and adjusting means connected between the support and the main frame, and operative independent of movement of the rake mechanism, for adjusting support about its hinge on the main frame.

16. A side-delivery rake, comprising a generally longitudinal main frame having front and rear ends; laterally spaced apart coaxial wheels carrying at least one end of the frame and fixing the same at a constant height above the ground; a sub-frame extending generally transversely of the main frame; means including pivots alined on a generally transverse axis for carrying the sub-frame on the main frame for vertical movement of the former with respect to the latter; adjusting means carried by the main frame and connected to the sub-frame for moving the latter vertically with respect to the former about said axis; a rotatable rake reel carried by the sub-frame; means for rotating the rake reel, including a substantially horizontal drive shaft extending generally transversely of the main frame and carried by one of the frames, and having opposite end portions; power-transmitting means between the one end portion of said shaft and one end portion of the rake reel; and power-transmitting means between the other end portion of said shaft and the wheel means, including a countershaft carried by the main frame on an axis above and parallel to the wheel axis and substantially in horizontal alinement with the drive shaft, a pair of rotatable driven members, one at each of opposite end portions of said countershaft, a pair of rotatable driving members, one for each wheel, drive means connecting the driving members respectively with the driven members, means connecting the driving members respectively to the wheels, means connecting the driven members respectively to opposite ends of the countershaft, and one of said last named means including a one-way clutch for each of the members in the associated pair.

17. A side delivery rake, comprising: a generally longitudinal main frame having front and rear ends; a pair of longitudinally spaced means for respectively supporting the front and rear ends of the frame and fixing the frame at a constant height above the ground; a reel-carrying frame arranged with respect to the main frame to extend diagonally thereof; means for suspending the reel-carrying frame from the main frame and providing for floating up-and-down movement of the reel-carrying frame relative to the main frame, including a support, means for fixing the support on the main frame against movement relative to the main frame at least in a direction consonant with downward movement of the reel-carrying frame, a lost-motion connection between the fixed support and the reel-carrying frame and providing for upward movement of the reel-carrying frame relative to the fixed support and further a limit against downward movement of the reel-carrying frame relative to said fixed support, and yielding means connected between the support and the reel-carrying frame in parallel with the lost-motion connection, said yielding means being biased to create a tendency for the reel-carrying frame to move upwardly and yieldable to cushion within said limiting effect of the lost-motion means to cushion movement of the reel-carrying frame downwardly relative to the fixed support; and a rake reel rotatably carried by the reel-carrying frame independently of the main frame.

18. The invention defined in claim 17, further including: horizontal pivot means connected between the main frame and the reel-carrying frame in spaced relation to the suspending means so that up-and-down movement of the reel-carrying frame relative to the main frame is confined to an arc about a horizontal axis, and said pivot means including vertically adjustable parts providing for varying the level of said axis.

GEORGE B. HILL.

References Cited in the file of this patent

UNITED STATES PATENTS

| Number | Name | Date |
|---|---|---|
| 117,639 | Johnson | Aug. 1, 1871 |
| 122,487 | Perry | Jan. 2, 1872 |
| 218,634 | Locke | Aug. 19, 1879 |
| 842,208 | Kirkman | Jan. 29, 1907 |
| 1,283,474 | Dain | Nov. 5, 1918 |
| 2,040,692 | Hitchcock | May 12, 1936 |
| 2,336,117 | Moschel et al. | Dec. 7, 1943 |